United States Patent
Bradley (10) Patent No.: US 12,419,302 B2
(45) Date of Patent: Sep. 23, 2025

(54) ADAPTABLE DECOY MOTION SYSTEM FOR SIMULATING NATURAL MOVEMENTS OF A WATERFOWL

(71) Applicant: Maxwell Bradley, Selmer, TN (US)

(72) Inventor: Maxwell Bradley, Selmer, TN (US)

(*) Notice: Subject to any disclaimer, the term of this patent is extended or adjusted under 35 U.S.C. 154(b) by 178 days.

(21) Appl. No.: 18/195,333

(22) Filed: May 9, 2023

(65) Prior Publication Data
US 2023/0371497 A1 Nov. 23, 2023

Related U.S. Application Data

(60) Provisional application No. 63/344,955, filed on May 23, 2022.

(51) Int. Cl.
*A01M 31/06* (2006.01)
(52) U.S. Cl.
CPC .................................. *A01M 31/06* (2013.01)
(58) Field of Classification Search
CPC ........ A01M 31/06; A63H 15/04; A63H 13/02
See application file for complete search history.

(56) References Cited

U.S. PATENT DOCUMENTS

| | | | | |
|---|---|---|---|---|
| 5,029,408 A * | 7/1991 | Smith | ................ | A01M 31/004 43/1 |
| 6,079,140 A * | 6/2000 | Brock, IV | ............ | A01M 31/06 43/3 |
| 6,321,480 B1 | 11/2001 | Solomon | | |
| 6,601,333 B2 | 8/2003 | Cicoff et al. | | |
| 7,137,221 B2 * | 11/2006 | Highby | ................. | A01M 31/06 43/2 |
| 7,272,905 B1 * | 9/2007 | Horton | ................. | A01M 31/06 43/2 |
| 7,322,144 B2 * | 1/2008 | Brewer | ................ | A01M 31/06 43/3 |

(Continued)

FOREIGN PATENT DOCUMENTS

JP S62175297 A * 7/1987

OTHER PUBLICATIONS

AMAZON; Decoy Motor w/Clip for Drive Waterfowl Decoys Hunting, Universal Decoys Motor; https://www.amazon.com/GUGULUZA-Waterfowl-Decoys-Hunting-Universal/dp/B07RL68KXB.

(Continued)

*Primary Examiner* — Magdalena Topolski
(74) *Attorney, Agent, or Firm* — HULSEY P.C.

(57) ABSTRACT

An adaptable decoy motion system for simulating natural movement of the waterfowls includes a motor assembly that connects to a tripod placed over the ground. The tripod helps to float a decoy on the surface of water at a desired height from the ground. The tripod includes a swivel arm. The motor controls the swivel rod to turn 360 degrees horizontally. Further, the motor controls the swivel rod to lift up causing the decoy attached to the connecting rod to take-off to flight and land on the surface of the water. The adaptable decoy motion system presents interchangeable attachments that allow to move or direct or reverse or transform water action for desired effect. The adaptable decoy motion system encompasses a tank for storing water. The tank is filled and emptied to create a diving or feeding movement for the decoy.

10 Claims, 12 Drawing Sheets

(56) References Cited

U.S. PATENT DOCUMENTS

| | | | |
|---|---|---|---|
| 7,434,347 B1 * | 10/2008 | Powell | A01M 31/06 43/3 |
| 7,895,779 B2 * | 3/2011 | Schnuckle | A63H 13/02 446/361 |
| 8,919,028 B2 | 12/2014 | Young | |
| 9,101,128 B2 * | 8/2015 | Barley | A01M 31/06 |
| 9,402,387 B2 | 8/2016 | Goodman et al. | |
| 9,414,583 B2 * | 8/2016 | Burton | A01M 31/06 |
| 9,686,977 B2 * | 6/2017 | Schauer | A01M 31/06 |
| 9,924,711 B1 | 3/2018 | Gill, II | |
| 9,943,074 B2 * | 4/2018 | Balgaard | A01M 31/06 |
| 10,219,511 B2 | 3/2019 | Bullerdick et al. | |
| 10,517,290 B2 | 12/2019 | Young | |
| 11,083,189 B1 | 8/2021 | Baskfield | |
| 11,147,264 B1 * | 10/2021 | Reynoso | A01M 31/06 |
| 11,517,011 B1 * | 12/2022 | Barker | F16M 13/02 |
| 12,245,583 B1 * | 3/2025 | Alsager | A01M 31/00 |
| 2004/0025770 A1 * | 2/2004 | Saunoris | B63B 34/05 114/40 |
| 2009/0188148 A1 | 7/2009 | Orris et al. | |
| 2015/0059229 A1 | 3/2015 | Miller | |
| 2017/0295775 A1 | 10/2017 | Smith | |
| 2021/0141379 A1 | 5/2021 | Deloach, III | |

OTHER PUBLICATIONS

OZ_DECOYS; ZigZag Swimmer (Mallard Drake); https://ozdecoys.com/index.php?route=product/product&product_id=143.

Knutson's Sporting Goods; Motorized Floating Motion Decoys; https://www.knutsondecoys.com/decoymotion/motorized_float_swimmer.html.

DUCKCREEKDECOYS; Motion Duck Decoys; https://www.duckcreekdecoys.com/products/the-original-flashback-animated-eatting-duck-decoy.

MOJO; MOJO® Rippler; https://www.mojooutdoors.com/other-motion-devices/mojo-rippler-deco.

ALIEXPRESS; Electric Flying Duck Decoys Motion Outdoor Hunting Shooting Realistic Full Body 3d Flyer Deck Hunting Prop Remote Control; https://www.aliexpress.com/i/1005001934249318.html.

LUCKYDUCK; Decoy Deceiver; https://www.luckyduck.com/decoy-deceiver/.

* cited by examiner

ADAPTABLE DECOY MOTION SYSTEM FOR SIMULATING NATURAL MOVEMENTS OF A WATERFOWL

CROSS-REFERENCE TO RELATED APPLICATIONS

The present application claims priority from U.S. Provisional Patent Application Ser. No. 63/344,955, filed on May 23, 2022, which is incorporated herein in its entirety and referenced thereto.

FIELD OF INVENTION

The present invention generally relates to decoys used during hunting animal species such as waterfowls. More specifically, the present invention relates to an adaptable decoy motion system that simulates the natural or lifelike movement of the waterfowls.

BACKGROUND OF INVENTION

It is known that waterfowls such as ducks, geese, or swans are hunted for sport, food and feathers for centuries. A typical tactic to hunt the waterfowls include remaining in a stationary position hidden from view by a hunting blind. Other methods include attracting the waterfowls to a location, such as using an attracting call, decoy, or a combination thereof. For example, a hunter places one or more decoys shaped as lifelike replicas of the waterfowls in a target area to attract prey. The hunter waits nearby in hiding, such as behind a blind, hoping that the decoys attract the waterfowls to the target area.

Typically, the decoys are made of wood, plastic or any other suitable material. The decoys are designed to either float on the surface of the water or tethered to a post or another object placed in the ground. The decoys drift in the water and allow for later retrieval.

Several attempts have been made in the past to operate the decoys, which simulate the natural movement of the waterfowls on the surface of the water. One such example is disclosed in a U.S. Pat. No. 6,601,333, entitled, "Remote controlled game decoy and game retriever" ("the '333 Patent"). The '333 Patent discloses a remote controlled game decoy is provided that includes a number of functional components allowing an operator to control the game decoy for varied operations. The gamed decoy is self-propelled. Propulsion may be achieved either by a motor driven propeller or by a jet propulsion system. A rudder may be provided with the propeller to enhance mobility of the decoy. The jet propulsion system incorporates a pump which forces a flow of liquid to exit the decoy. The flow of liquid can be accelerated and directionally controlled by a nozzle placed in-line with the exiting flow of liquid. A retrievable anchor may be employed to station the decoy at a desired location. A gamed retrieval device may also be provided to retrieve downed game. In one arrangement, a retrievable snare or hook is used to retrieve downed game. In another arrangement, a plurality of retractable/extendable tines are used to retrieve downed game.

Another example is disclosed in a U.S. Pat. No. 9,402,387, entitled "Waterfowl decoy motion system and method" ("the '387 Patent"). The '387 Patent discloses a waterfowl decoy motion system that comprises a self-propelled floating decoy tethered to a submerged line supported below the surface of a body of water by stakes driven into the water bottom. A thruster is attached to the bottom of the decoy such that the direction of propulsion is offset from a longitudinal axis extending along the length of the decoy by an angle of at least one degree. The tether is slidably attached to the submerged line, and a swivel located on the tether allows the decoy to rotate freely. The decoy is guided by the line as it moves across the surface of the water. When the tether reaches a stopper near each end of the line, the offset propulsion angle causes the decoy to turn in an arcing path, turn around, and travel in the opposite direction. The decoy repeats this process in a continuous loop.

Another example is disclosed in a U.S. Pat. No. 10,517,290, entitled "Decoy motion attachment device" ("the '290 Patent"). The '290 Patent discloses a motion attachment device designed to be attached to the keel of a decoy includes a housing that is configured to releasably receive the keel. An actuator in the housing is connected to and moves one or more appendages also attached to the housing. The device can be attached to different decoys at different times.

Yet another example is disclosed in a United States Publication No. 20150059229, entitled "Waterfowl Decoy with Interchangeable Multifunction Feature Keels" ("the '229 Publication"). The '229 Publication discloses floating waterfowl decoys featuring a multiplicity of interchangeable multifunction feature keels that allow the user to equip the decoy with various animating, affixing, and retrieving systems.

Although the above-discussed decoys are useful for simulating the natural movement of the waterfowls, they have few problems. For example, the above-discussed decoys are not entirely submersible. Further, the decoys do not create a significant movement of the water thereby limiting the lifelike motion for the decoys.

Therefore, there is a need for a decoy motion system that imitates a decoy, simulates the natural movement of the waterfowls and allows for mounting different attachments for creating direct or reverse or transform water action for creating desired effect.

SUMMARY

It is an object of the present invention to provide an adaptable decoy motion system that imitates a decoy and simulates the natural movement of the waterfowls and that avoids the drawbacks of known decoy motion systems.

It is another object of the present invention to provide an adaptable decoy motion system that allows for mounting different attachments for creating direct or reverse or transform water action for creating desired effect.

It is yet another object of the present invention to provide an adaptable decoy motion system that simulates any aspect of normal waterfowl activity such as taking-off to flight to landing, swimming, diving, feeding, splashing, etc.

In order to achieve one or more objects, the present invention presents an adaptable decoy motion system having a motor assembly. The motor assembly connects to a tripod or any other structure placed over the land. The tripod helps to position a decoy at a desired height i.e., over the surface of the water. The tripod includes a swivel arm that controls the movement of the decoy via a connecting rod. The motor operates with an intermittent time delay, say turns on for three (3) seconds and turns off for seven (7) seconds. The motor operation is repeated or varied to create a blast of motion and to subside.

The motor operates in such a way that the swivel rod turns/rotates 360 degrees horizontally. Additionally, the motor controls the swivel rod to lift up causing the decoy attached to the connecting rod to take-off to flight and land on the surface of the water.

The motor assembly connects to a thruster/propeller which in turn connects to a connecting member. The connecting member connects to fins. The fins mimic the feet of the decoy. During operation, the fins produce lateral wake and noise with forward/rearward movement. In one example, the fins are provided in orange colour to mimic the feet of waterfowl. This helps to lure the waterfowls closer to the decoy.

The adaptable decoy motion system presents interchangeable attachments such as spool attachment, osculate attachment, etc. The interchangeable attachments allow to move or direct or reverse or transform water action for desired effect. Further, the interchangeable attachments create action via direct connection to the drive component. For example, the spool attachment includes a spool to retract a line and release when tension reaches a certain threshold. The osculate attachment includes a mechanism to transform rotational movement into horizontal or vertical osculating movement.

The adaptable decoy motion system encompasses a tank that fills or empties water from it. The tank is filled and emptied to create a diving and/or feeding movement for the decoy.

In another aspect, the adaptable decoy motion system is operated in conjunction with an ice clearing pump attachment. The ice clearing pump attachment includes a pole having a pump. The pole extends from the bottom of a water body such as pond/lake and above a frozen ice surface/ice bed. The motor includes a first (intake) tube and a second (exhaust) tube. The motor draws warmer water using the first tube and expels over the surface of the ice using the second tube. The movement of the warm water on the frozen ice surface helps melt the ice and clear an area to attract waterfowls by giving them thawed space to land and feed. The cleared area also gives hunters an area to place decoys. The ice clearing pump attachment provides the added benefit of producing current in the water to animate the decoys.

In one advantageous feature of the present invention, the adaptable decoy motion system creates a lifelike motion and significant water movement either independently or in conjunction with waterfowl decoys via rigid or quick release connection.

In another advantageous feature of the present invention, the adaptable decoy motion system allows to attach any decoy with a keel for simulating any aspect of normal waterfowl activity such as from take-off to flight to landing, swimming, diving, feeding, splashing, etc.

Features and advantages of the invention hereof will become more apparent in light of the following detailed description of selected embodiments, as illustrated in the accompanying FIGUREs. As will be realised, the invention disclosed is capable of modifications in various respects, all without departing from the scope of the invention. Accordingly, the drawings and the description are to be regarded as illustrative in nature.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

Before the present features and working principle of an adaptable decoy motion system is described, it is to be understood that this invention is not limited to the particular device as described, since it may vary within the specification indicated. Various features of the adaptable decoy motion system might be provided by introducing variations within the components/subcomponents disclosed herein. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It should be understood that the present invention describes an adaptable decoy motion system for simulating natural movement of the waterfowls. The adaptable decoy motion system includes a motor assembly that connects to a tripod placed over the ground. The tripod helps to float a decoy on the surface of water at a desired height from the ground. The tripod includes a swivel arm. The motor controls the swivel rod to turn 360 degrees horizontally. Further, the motor controls the swivel rod to lift up causing the decoy attached to the connecting rod to take-off to flight and land on the surface of the water. The adaptable decoy motion system presents interchangeable attachments such as a spool attachment, and an osculate attachment. The interchangeable attachments allow to move or direct or reverse or transform water action for desired effect. The adaptable decoy motion system encompasses a tank for storing water. The tank is filled and emptied to create a diving or feeding movement for the decoy.

Various features and embodiments of an adaptable decoy motion system for simulating natural movement of the waterfowls are explained in conjunction with the description of FIGS. 1-17.

Figure 1:
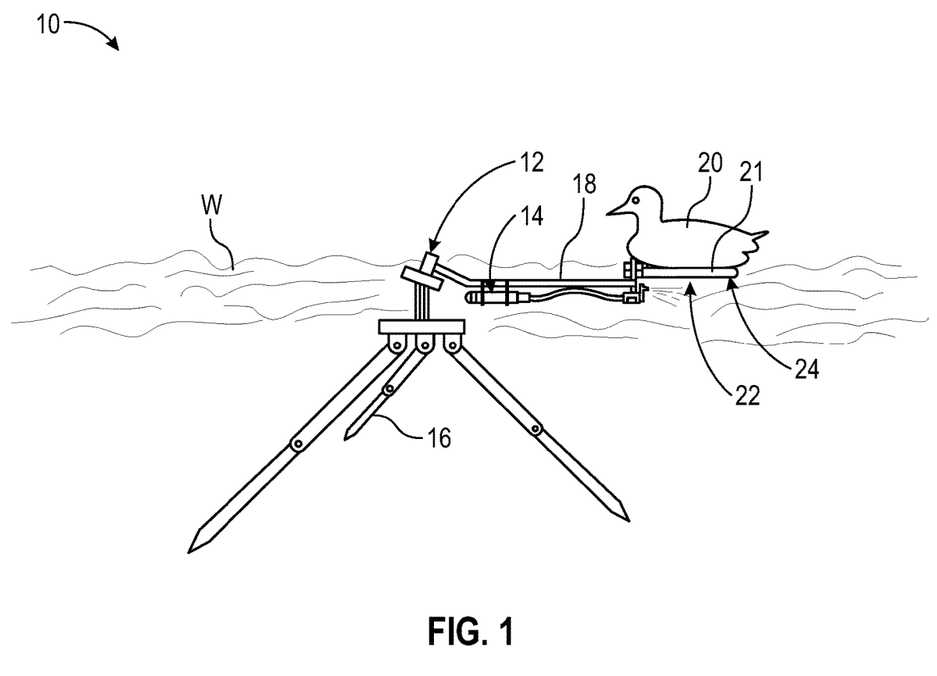
FIG. 1 illustrates an environment in which an adaptable decoy motion system implements, in accordance with one exemplary embodiment of the present invention.

The present invention discloses an adaptable decoy motion system for simulating natural movement of the waterfowls. FIG. 1 shows an environment 10 in which an adaptable decoy motion system 12 implements, in accordance with one exemplary embodiment of the present invention. Adaptable decoy motion system 12 includes a motor assembly 14. Motor assembly 14 mounts over a base structure or tripod 16. The present invention is explained considering motor assembly 14 mounts over a tripod 16 via a swivel rod 19. However, it is possible to mount motor assembly 14 over a post or any other support structure placed over the ground. Motor assembly 14 connects to an animal decoy 20 (hereinafter referred to as "decoy") via a connecting rod 18. In the present embodiment, decoy 20 is shown in the form of a duck, however, it should be understood that other animal species may be used in place of the duck without departing from the scope of the present invention. Decoy 20 includes a keel 21 at the bottom of its body. Keel 21 maintains decoy 20 in an upright manner when afloat over the surface of the water W. Adaptable decoy motion system 12 includes one or more attachments 22 such as a spool attachment and an osculate attachment, which are explained in the later part of the description. In the present embodiment, connecting rod 18 encompasses an anchor 24 that removably receives keel 21 of decoy 20.

Figure 2:
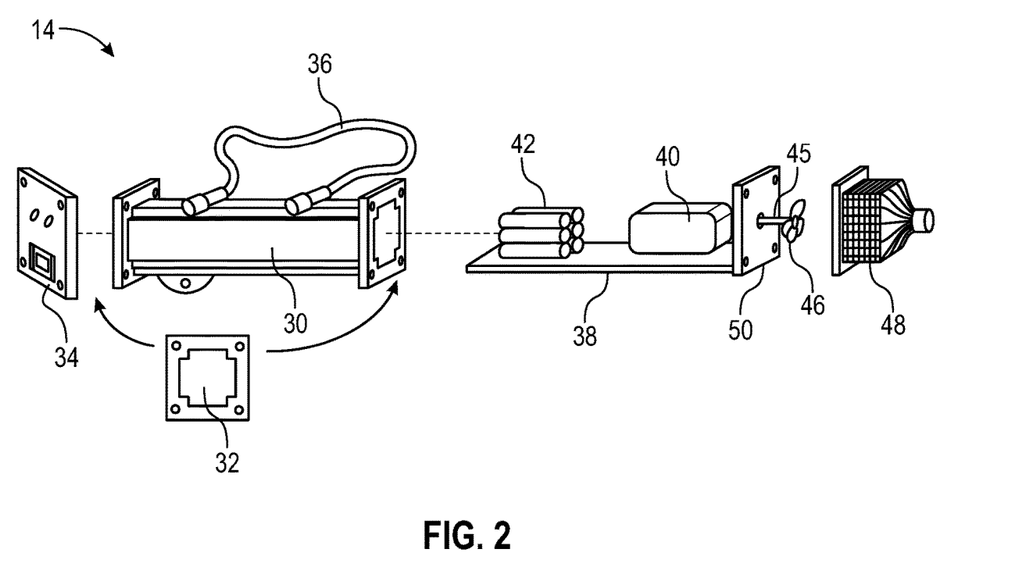
FIG. 2 illustrates an exploded view of a motor assembly of the adaptable decoy motion system.
Figure 3A:
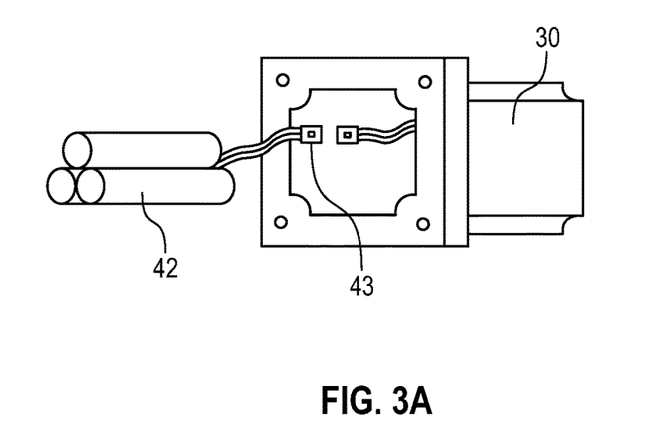
FIGS. 3A, 3B, 3C and 3D illustrate assembly of components in the motor assembly, in accordance with one embodiment of the present invention.
Figure 3B:
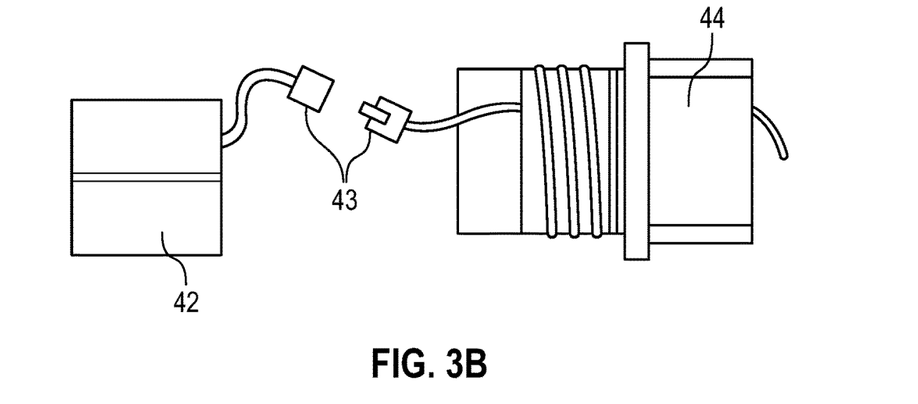
Figure 3C:
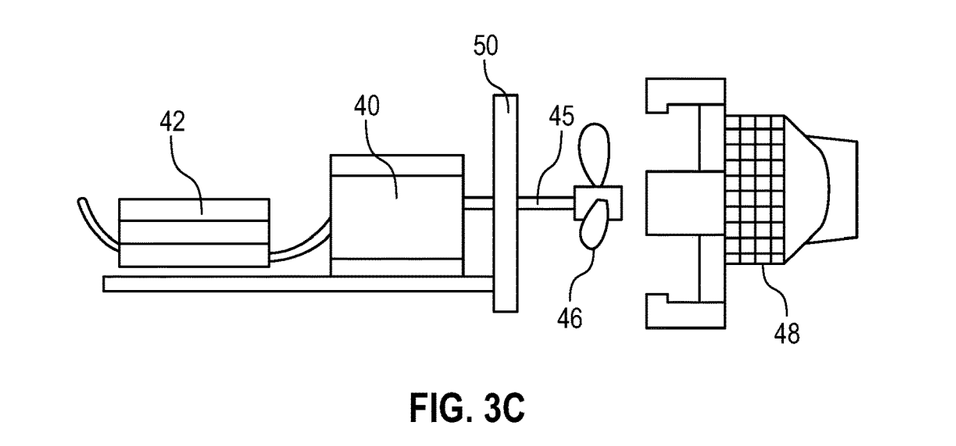
Figure 3D:
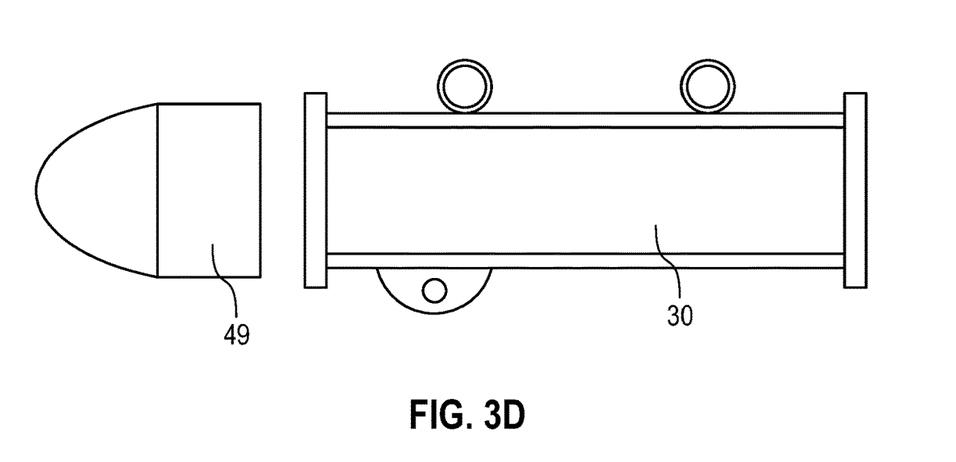

FIG. 2 shows an exploded view of motor assembly 14, in accordance with one exemplary embodiment of the present invention. Motor assembly 14 includes a housing 30 made of metal, plastic or any other suitable material. Housing 30 comes in a rectangular or square or any other configuration. Housing 30 encompasses magnetic clutch plates such as a first plate 32 at one end and a second plate 34 at another end. First plate 32 and second plate 34 act as end plates that mount from both ends of housing 30 and form a closed structure. In one implementation, housing 30 encompasses a connecting member 36. Connecting member 36 indicates an elastic member or threaded member. Connecting member 36 helps to connect housing 30 to connecting rod 18. Motor assembly 14 encompasses a platform 38 for receiving a motor 40. Motor 40 operates using the power drawn from a battery 42 via a wiring 43, as shown in at least FIG. 3A. In one example, wiring 43 draws through a gasket 44 and connects battery 42 and motor 40, as shown in FIG. 3B. Motor 40 connects to a shaft 45, which in turn connects to a propeller 46, as shown in FIG. 3C. Propeller 46 connects to a thruster 48. In one example, housing 30 encompasses a cup 49 for sealing second plate 34, as shown in FIG. 3D.

Figure 4:
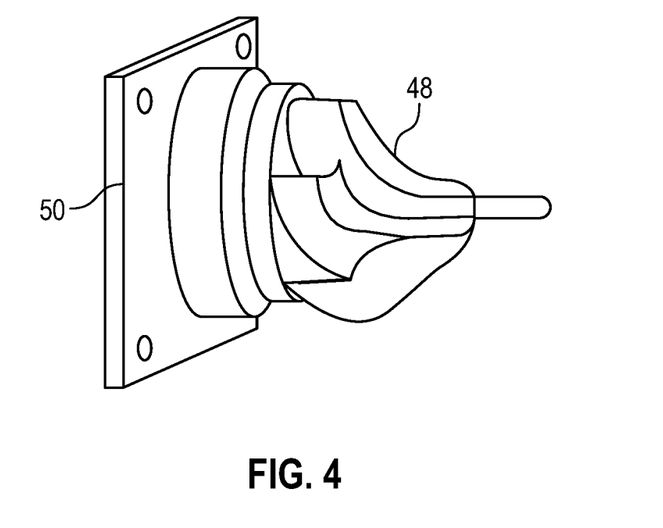
FIG. 4 illustrates a perspective view of a thruster, in accordance with one embodiment of the present invention.
Figure 5:
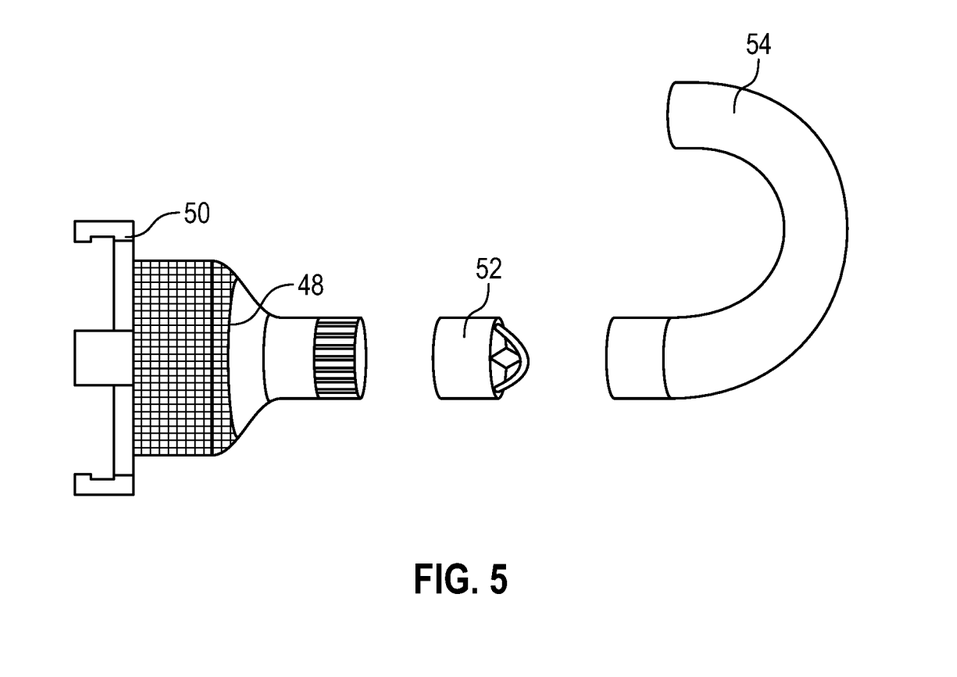
FIG. 5 illustrates the thruster connecting to a rudder and a connecting member, in accordance with one embodiment of the present invention.
Figure 6:
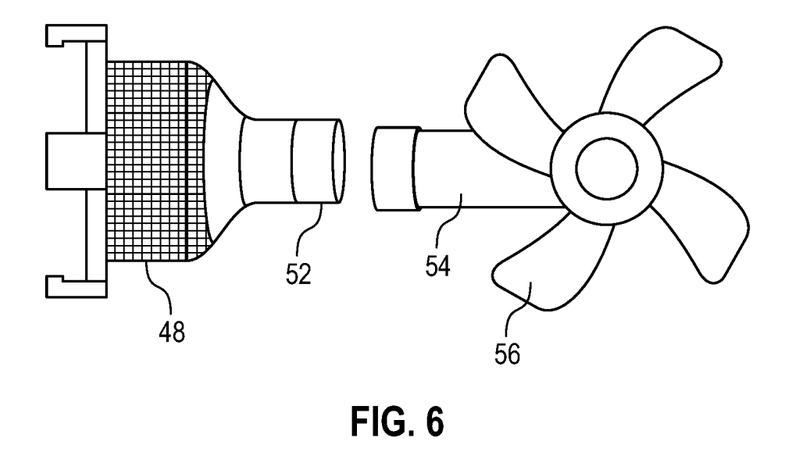
FIGS. 6 and 7 illustrate various configuration of the connecting member connecting fins, in accordance with one embodiment of the present invention.

Thruster 48 encompasses a plate member 50. Thruster 50 includes a rudder 52. Rudder 52 connects and helps to steer connecting member 54. Connecting member 54 indicates a flexible tubular structure. Connecting member 54 configures to position in a straight, bent, and twist configuration depending on the need. FIG. 5 shows an exemplary embodiment in which connecting member 54 is positioned in a reverse/bent configuration. In operation, motor 40 drives shaft 45 which then operates rudder 52 via thruster 48. Rudder 52 steers connecting member 54 either left/right/high wake/discharge into deep water with subtle movements. In one example, connecting member 54 encompasses fins 56 at one end, as shown in FIG. 6. Fins 56 mimic feet of decoy 20. During operation, fins 56 produce lateral wake and noise with forward/rearward movement. In one example, fins 56 are provided in orange colour to mimic the feet of a waterfowl. This helps to lure the waterfowls closer to decoy 20.

Figure 7:
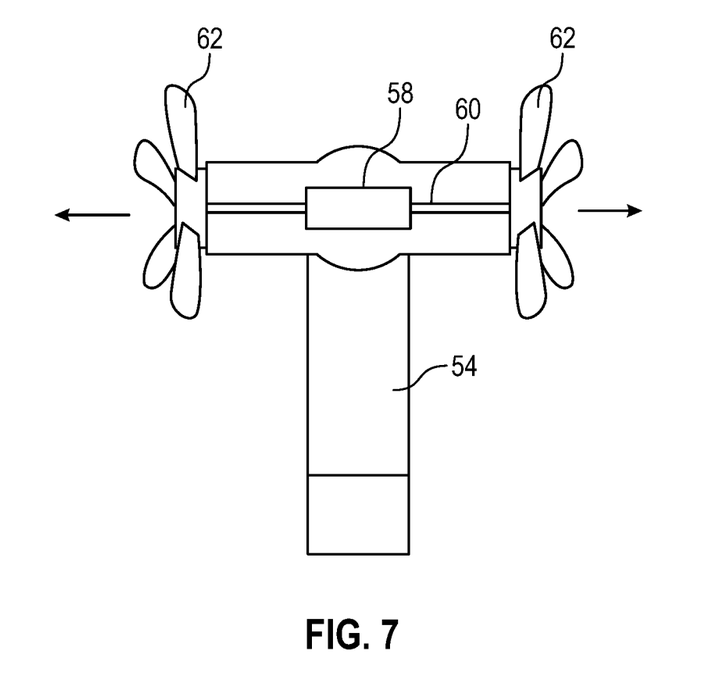

In another example, connecting member 54 connects to a turbine 58, as shown in FIG. 7. FIG. 7 is shown in upside down configuration. Turbine 58 connects to an axle 60 which in turn connects to two fins 62. As presented above, fins 62 mimic legs/feet of decoy 20. Fins 62 are provided in orange colour to mimic feet of waterfowl. Fins 62 create a thrust and help decoy 20 to move forward/rearward depending on the need.

Figure 8:
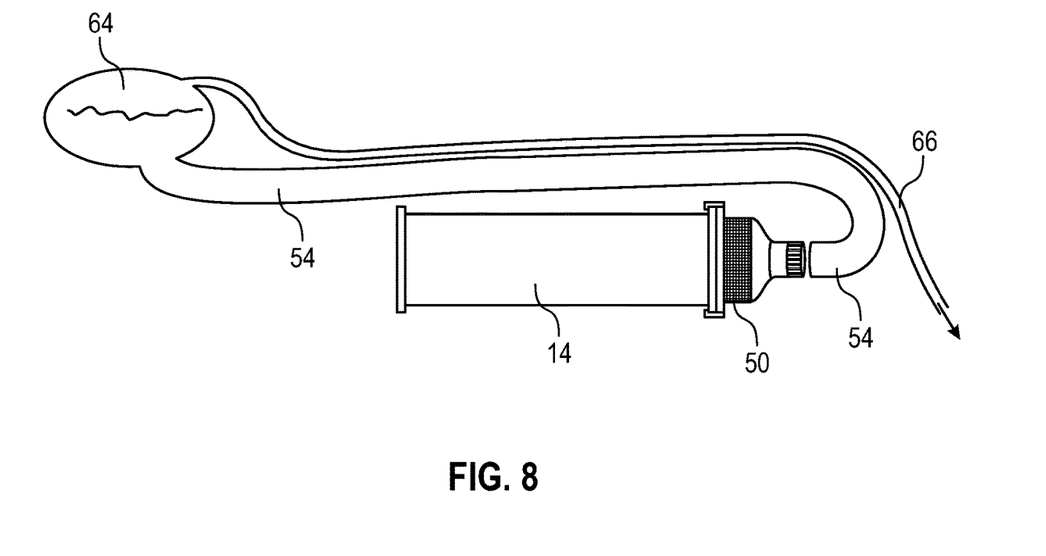
FIG. 8 illustrates the motor assembly connecting a tank via the connecting member, in accordance with one embodiment of the present invention.
Figure 9A:
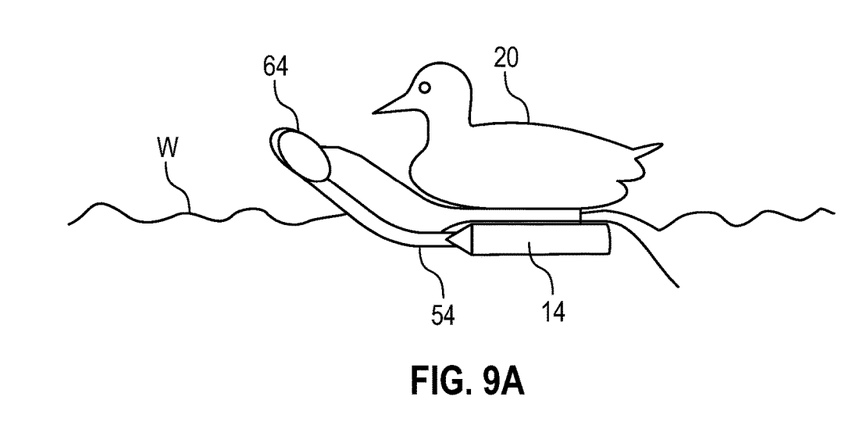
FIGS. 9A through 9D illustrate the feature of filling and emptying water from the tank to create various lifelike movements by a decoy, in accordance with one embodiment of the present invention.
Figure 9B:
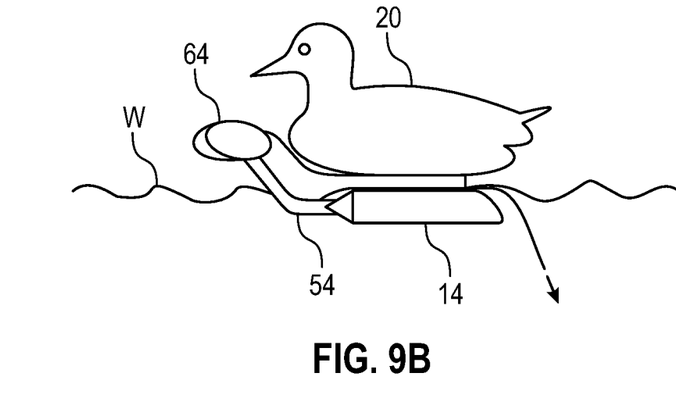
Figure 9C:
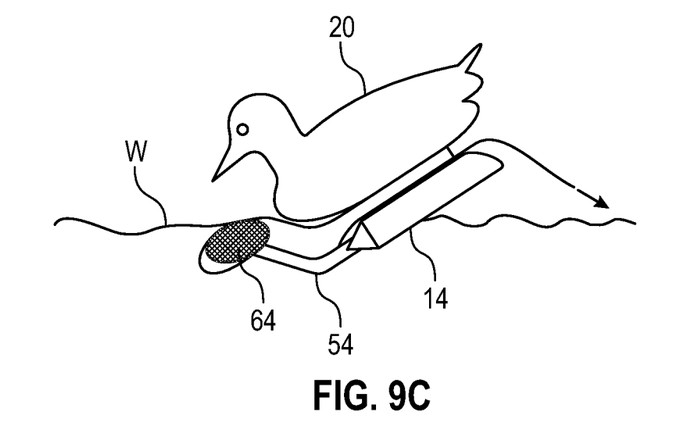
Figure 9D:
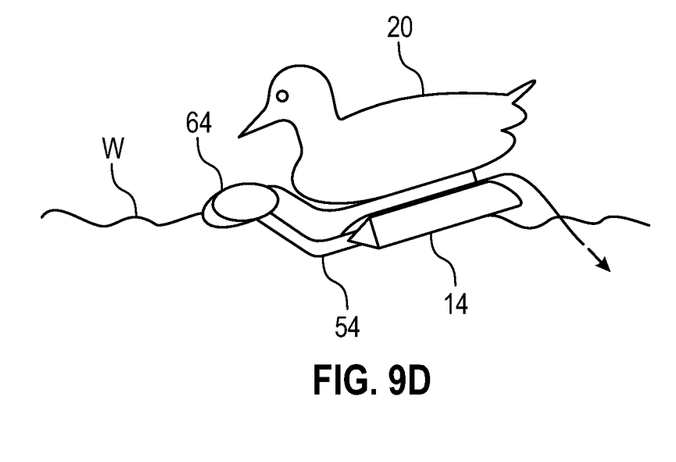

FIG. 8 shows motor assembly 14 connecting a tank 64 via connecting member 54. Tank 64 indicates a hollow structure used for storing water. Tank 64 connects to a pipe 66. Pipe 66 helps to drain water from tank 64 and empty it. FIGS. 9A through 9B show decoy 20 position with respect to filling up of water in tank 64. FIG. 9A shows position of decoy 20 on water W in idle position. Here, tank 64 stays empty and allows decoy 20 to stay afloat. FIG. 9B shows position of decoy 20 when motor 40 is on. Here, the water gets pumped into tank 64. FIG. 9C shows position of decoy 20 when water is filled in tank 64. When water gets filled in tank 64, the weight of tank 64 increases pulling decoy 20 into the water W. Repeating the pattern of filling out and emptying tank 64 creates a diving and/or feeding movement for decoy 20. Further, water is pumped out from tank 64 through pipe 66. When the water is pumped out, the water creates a bubble effect or spray effect while decoy 20 floats and moves forward or reverse over the surface of water W. Once the water is drained out of tank 64, decoy 20 gets back to its original floating position. FIG. 9D shows position of decoy 20 back to its original position as in FIG. 9A upon emptying the water from tank 64.

Figure 10:
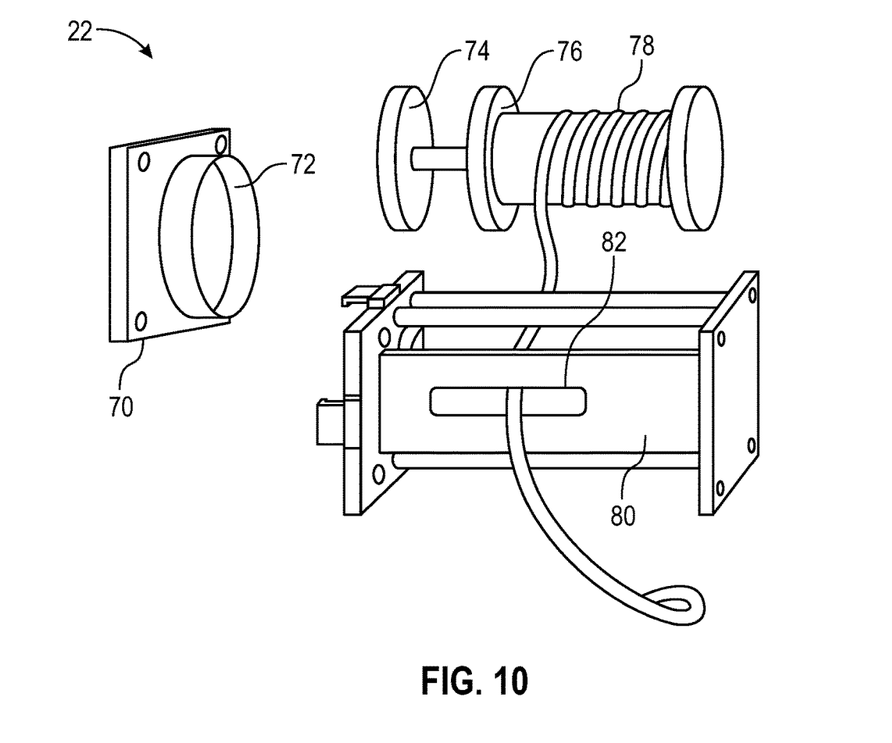
FIG. 10 illustrates a spool attachment, in accordance with one embodiment of the present invention.

Referring to FIG. 10, an exemplary attachment 22 is shown, in accordance with one embodiment of the present invention. Here, attachment 22 includes a connecting plate 70 that connects to connecting rod 18, for example. Connecting plate 70 encompasses an attachment receiving area 72. Here, attachment receiving area 72 receives a spool connector 74. Spool connector 74 connects to a spool 76 encompassing a monofilament control line or simply referred to as "line" 78. Spool 76 positions inside a frame 80 having an opening 82 for drawing line 78 through. Frame 80 connects to connecting plate 70. In accordance with the present invention, line 78 attaches to connecting rod 18 such that when force is exerted, line 78 pulls down decoy 20 causing it to submerge in the water W.

Figure 11A:
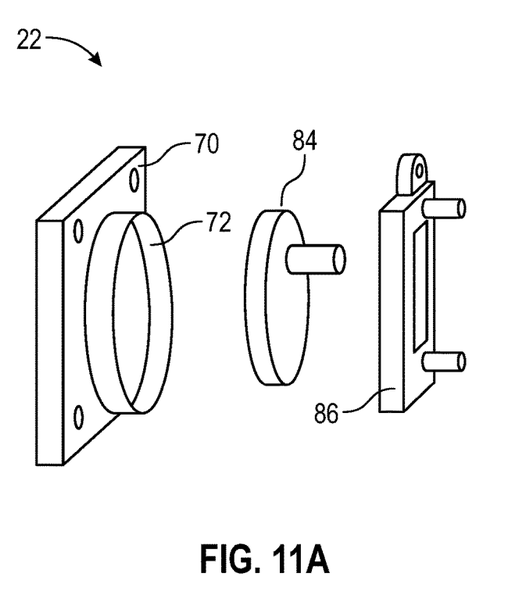
FIGS. 11A and 11B illustrate a side exploded view and a front view of an osculate assembly, in accordance with one embodiment of the present invention.
Figure 11B:
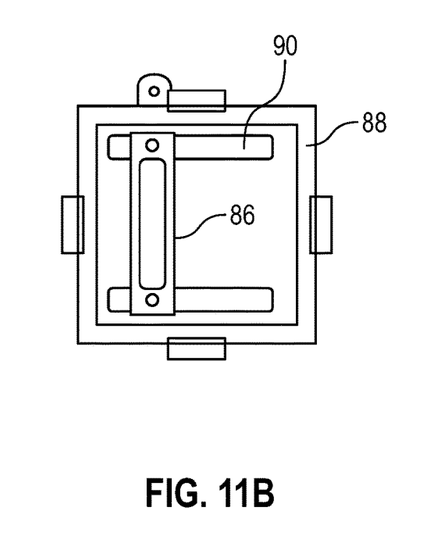

In one example, attachment 22 includes an osculate assembly. Here, attachment receiving area 72 receives an osculate connector 84, as shown in FIG. 11A. Osculate connector 84 connects to an osculating member 86 that osculates along openings 88 in frame 90 (FIG. 11B). In one example, osculating member 86 is replaced with a weighted member for creating ripples in the water W. Osculate assembly is used for creating an osculating movement. It should be understood that the osculate assembly is capable of osculating laterally or vertically depending on the need.

Figure 12:
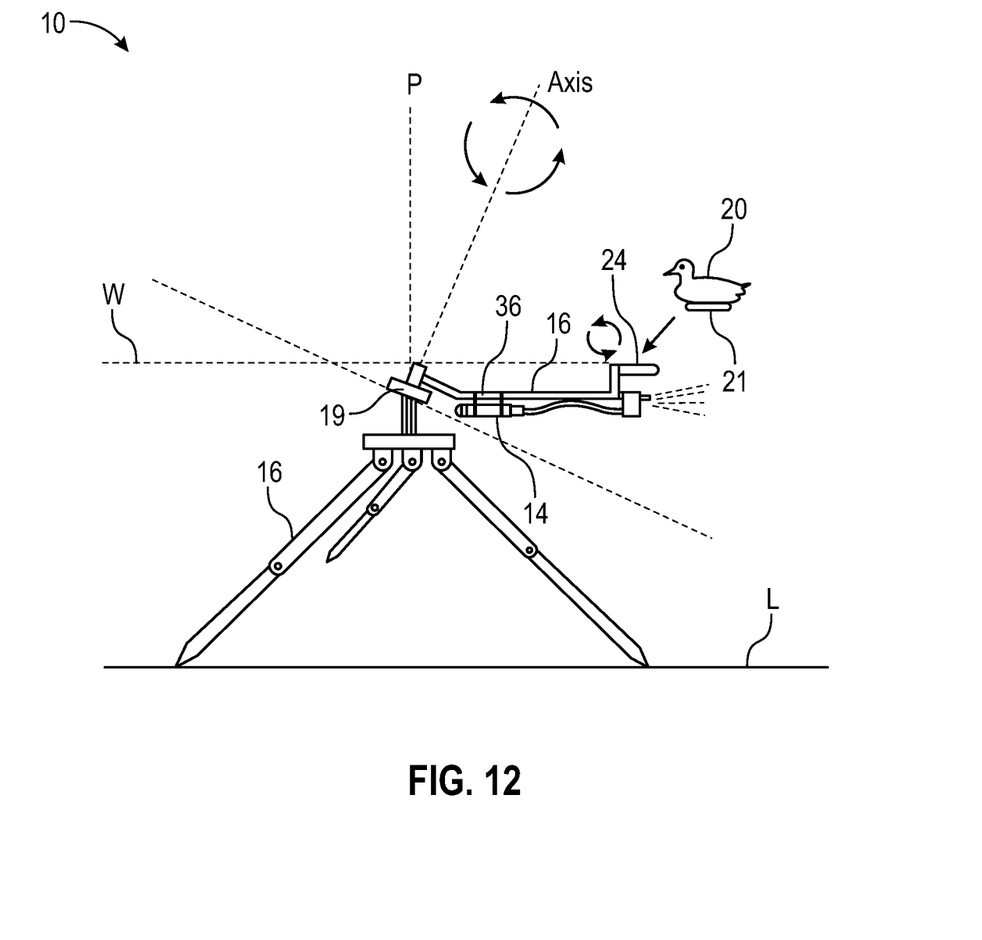
FIG. 12 illustrates the environment set up in which decoy system 12 is used, in accordance with one embodiment of the present invention.
Figure 13A:
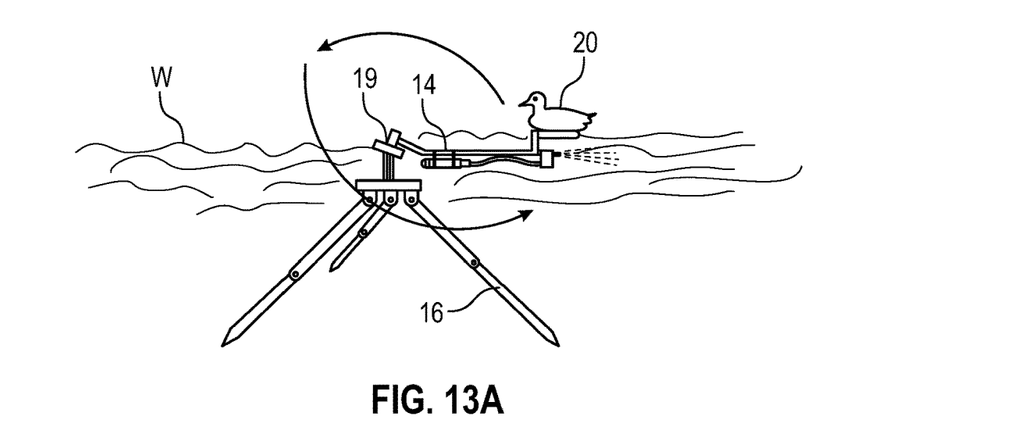
FIGS. 13A through 13C illustrate the feature of taking-off and landing of decoy from the surface of water, in accordance with one embodiment of the present invention.
Figure 13B:
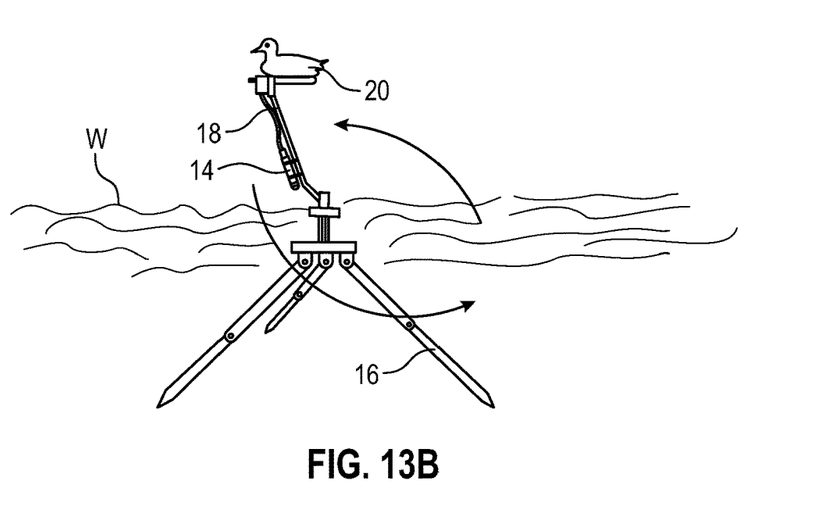
Figure 13C:
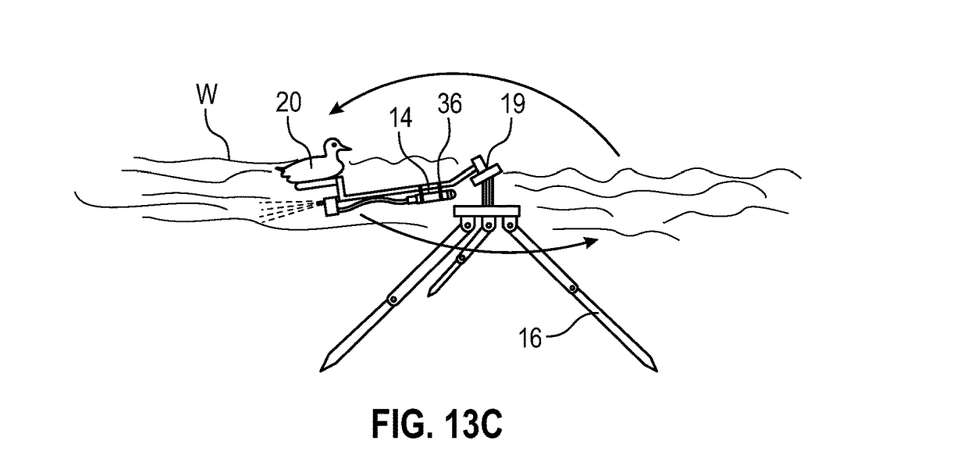

FIG. 12 shows environment 10 in which adaptable decoy motion system 12 is used, in accordance with one embodiment of the present invention. Here, connecting rod 18 is connected to tripod 16 via swivel rod 19. Depending on the depth of water W from land L, the height of tripod 16 is adjusted. Once the height is adjusted, keel 21 of decoy 20 is connected to anchor 24 at one end of connecting rod 18. Motor assembly 14 is connected to connecting rod 18 with the help of connecting member 36. Here, motor 40 is operated in such a way that swivel rod 19 turns 360 degrees horizontally. Additionally, swivel rod 19 lifts or raises about 20 degrees perpendicularly (P) from its horizontal position with an axis of rotation. This helps decoy 20 to be lifted above the surface of water W at a height h from the water and simulate the lifelike replica of waterfowl to change its position. Optionally, decoy 20 is lifted above the surface of water W and placed in reverse direction with the help of connecting rod 18 so as to simulate decoy 20 changing direction. In other words, swivel rod 19 operates to energize decoy 20 for movement from one place to another with the help of connecting rod 18. FIG. 13A shows decoy 20 in a particular direction while being held by connecting rod 18. FIG. 13B shows lifting of decoy 20 with the help of swivel rod 19. Here, swivel rod 19 swivels about 20 degrees from its original position (FIG. 13A) and turns about 180 degrees, as shown in FIG. 13B. As swivel rod 19 rotates, connecting rod 18 also rotates bringing decoy 20 out of water at an angle (a) of central pivot. Here, connecting rod 18 with decoy 20 reaches the height h (flight of decoy 20 from the surface of water W, e.g., one feet) using motor 40 and uses gravity to land decoy 20 back onto the surface of the water W. Upon reaching the desired area, swivel rod 19 drops decoy 20 onto the surface of water W such that the decoy 20 is made to face opposition direction from FIG. 13A, as shown in FIG. 13C.

Figure 14:
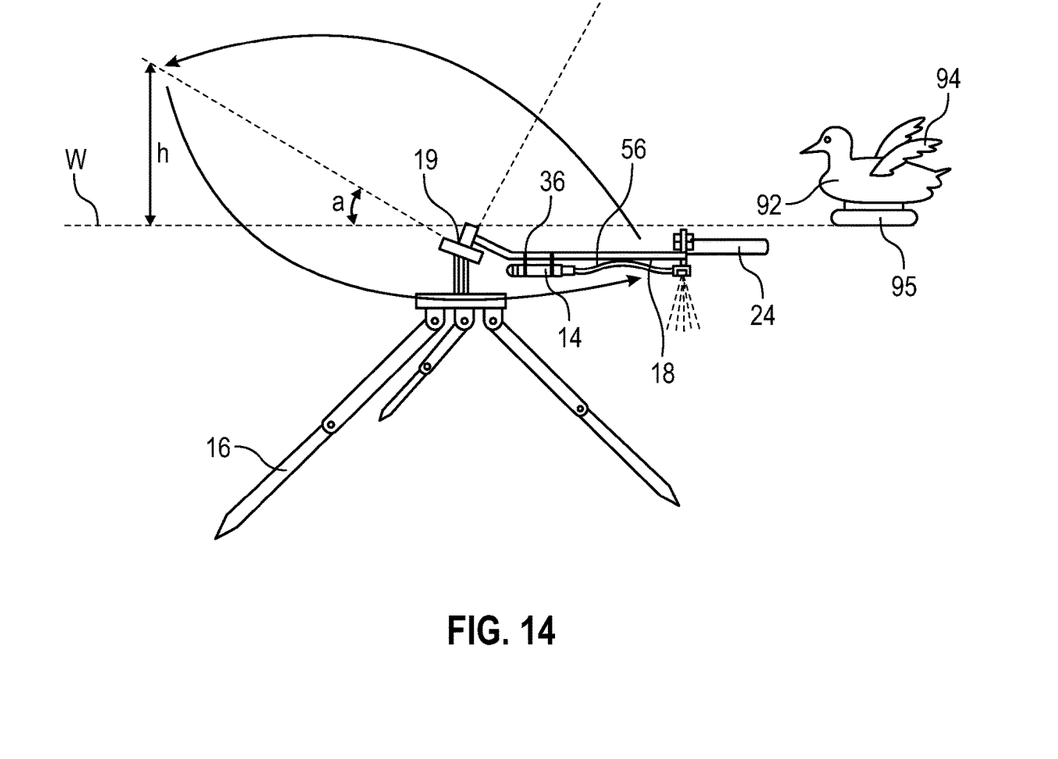
FIG. 14 illustrates the adaptable decoy motion system receiving a decoy having wings, in accordance with one embodiment of the present invention.
Figure 15:
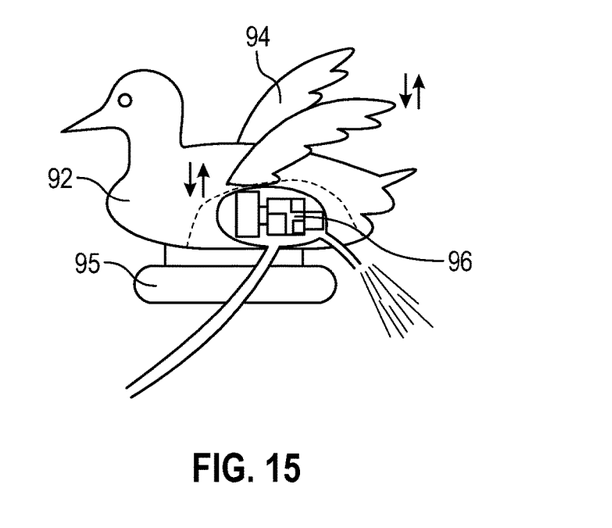
FIG. 15 illustrates the decoy having a motor, in accordance with one embodiment of the present invention.

FIG. 14 shows another embodiment of adaptable decoy motion system 12 that receives a decoy 92 having wings 94. Here, decoy 92 encompasses a keel 95 that connects to anchor 24. Optionally, decoy 92 encompasses a motor 96 for flapping wings 94, as shown in FIG. 15. Here, motor 96 encompasses a turbine (not shown) connected to wings 94 driven by water forced through the system and length of tubing by motor 96. Wings 96 operate to create an effect of splashing water.

Figure 16:
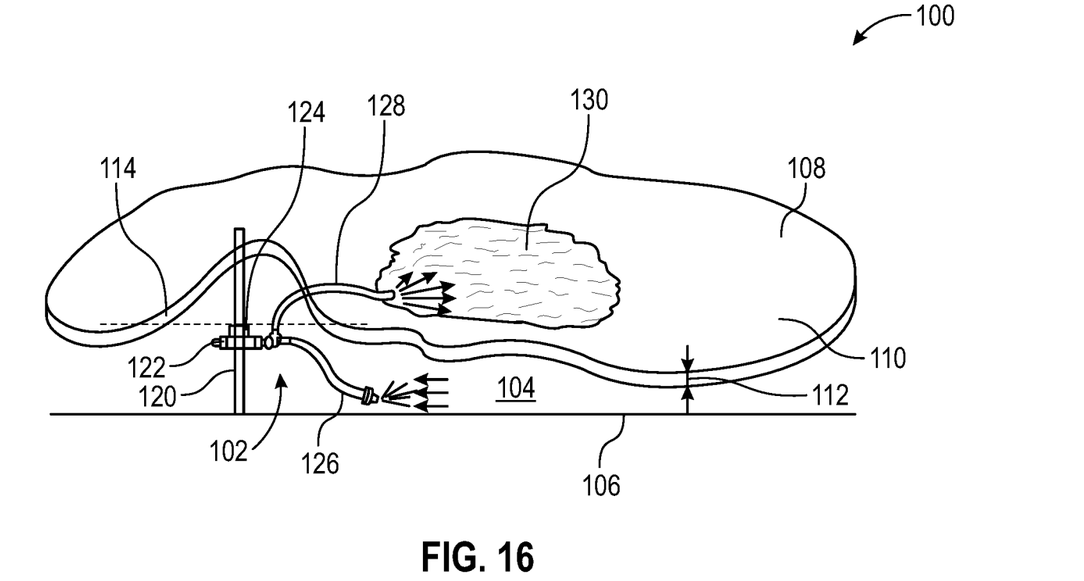
FIG. 16 illustrates an environment in which an ice clearing pump attachment implements, in accordance with one exemplary embodiment of the present invention.

FIG. 16 shows an environment 100 in which an ice clearing pump attachment 102 implements, in accordance with one embodiment of the present invention. Ice clearing pump attachment 102 is implemented in water body 104 over a lake floor 106. Here, water body or pond 104 is covered by ice/ice bed/frozen water/frozen water body 108 having surface 110 facing above. Ice 108 has a suitable thickness 112. The level of water in water body 104 is indicated by water line 114.

In accordance with the present embodiment, ice clearing pump attachment 102 includes a pole 120. Pole 120 includes an elongated rod or tripod or any other structure extending from lake floor 106 and above surface 110 of ice 108. Pole 120 is positioned slightly above or at the same level of ice 108 to keep it out of sight from waterfowls. Ice clearing pump attachment 102 includes a pump 122 connected to pole 120 via a pump connector 124. Pump connector 124 includes a cable or clip or clamp used for connecting pump 122 to pole 120. Pump 122 includes a first tube 126. First tube 126 extends from pump 122 and positions into water body 104. In one example, first tube 126 includes a ridged or corrugated intake tube. Pump 122 includes a second tube 128. Second tube 128 extends from motor 122 and positions above ice 108. In one example, second tube 128 includes a ridged or corrugated exhaust tube. In the present embodiment, pump 122 draws warmer water from water body 104 via first tube 126 and expels water 130 over surface 110, as shown in FIG. 16.

In one example, second tube 128 is colored, say provided in white color to blend in with ice 108. In operation, pump 122 draws warmer water from water body 104 via first tube 126 and expels water 130 over surface 110. The movement of warm water 130 on the frozen ice 108 helps to melt ice 108 and clear an area to attract waterfowls (not shown) by giving them thawed space to land and feed. The cleared area also gives hunters (not shown) an area to place decoys. Ice clearing pump attachment 102 provides the added benefit of producing current in the water to animate the decoys.

Figure 17:
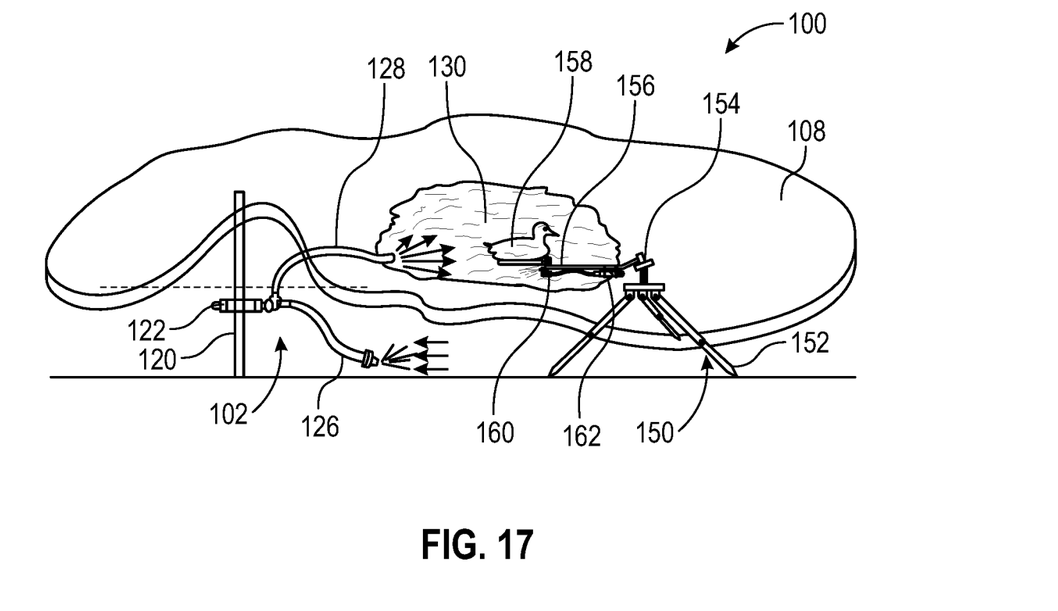
FIG. 17 illustrates an adaptable decoy motion system used in conjunction with the ice clearing pump attachment, in accordance with one exemplary embodiment of the present invention.

In one alternate embodiment, ice clearing pump attachment 102 is used in conjunction with an adaptable decoy motion system 150. FIG. 17 shows adaptable decoy motion system 150 used with ice clearing pump attachment 102. In one implementation, adaptable decoy motion system 150 includes all the components and operates similar to adaptable decoy motion system 12, explained above. Adaptable decoy motion system 150 includes a tripod or pole 152 extending from lake floor 106 and above surface 110. Tripod 152 includes a swivel rod 154. Swivel rod 154 presents a connecting rod 156. Connecting rod 156 extends from swivel rod 154. Connecting rod 156 includes an animal decoy 158. Further, swivel rod 154 includes a steer connecting member 160. Furthermore, adaptable decoy motion system 150 includes a motor 162. As explained above, motor 162 is operated in such a way that swivel rod 154 turns 360 degrees horizontally. Additionally, motor 162 controls swivel rod 154 to lift up causing decoy 158 attached to connecting rod 156 to take-off to flight and land on surface 110.

In order to hunt the waterfowls over frozen surfaces (or ice-covered pond), ice clearing pump attachment 102 can be used with adaptable decoy motion system 150. Here, ice clearing pump attachment 102 is used to draw warmer water from water body 104 via first tube 126 and expels water 130 over surface 110 using second tube 128. The movement of warm water 130 on the frozen ice 108 helps to melt ice 108 and clear an area to attract waterfowl (not shown) by giving them thawed space to land and feed. Concurrently, adaptable decoy motion system 150 is placed such that decoy 158 is made to position in water 130 on the frozen ice 108. Motor 162 is operated to control swivel rod 154 to lift up causing decoy 158 attached to connecting rod 156 to take-off to flight and land on surface 110.

Based on the above, it is evident that the presently disclosed adaptable decoy motion system helps to simulate any aspect of normal waterfowl activity such as simulating take-off to flight to landing, swimming, diving, feeding, splashing, etc. The adaptable decoy motion system helps to create lifelike motion and significant water movement either independently or in conjunction with waterfowl decoys via rigid or quick release attachments.

A person skilled in the art appreciates that the adaptable decoy motion system may come in a variety of sizes depending on the need and comfort of the user. Further, different materials in addition to or instead of materials described herein may also be used and such implementations may be construed to be within the scope of the present invention. Further, many changes in the design and placement of components may take place without deviating from the scope of the presently disclosed adaptable decoy motion system.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. An adaptable decoy motion system for simulating natural movement of a waterfowl, said adaptable decoy motion system comprising:
    a base structure extending from a surface, and to the level of a water body;
    a swivel rod connected to said base structure, wherein said swivel rod is configured to turn at an axis of rotation of 360 degrees horizontally with respect to said base structure;
    a connecting rod extending from said swivel rod;
    a decoy connected at a distal end of said connecting rod; and
    a motor assembly connected to said connecting rod, wherein said motor assembly comprises a thruster and a propeller, and wherein said thruster comprises a rudder,
    wherein said motor assembly is operated to lift said swivel rod about 20 degrees from said axis of rotation above said water body such that said decoy connected to said connecting rod lifts above said water body and simulates natural movement of a waterfowl.

2. The adaptable decoy motion system of claim 1, wherein said swivel rod turns about 180 degrees and lifts about 20 degrees from said axis of rotation such that said decoy is made to raise above said water body while turning, and wherein said swivel rod comes down due to gravity bringing said decoy onto the surface of said water body such that said decoy is made to face in another direction.

3. The adaptable decoy motion system of claim 1, wherein said base structure is a pole or a tripod.

4. The adaptable decoy motion system of claim 1, wherein said connecting rod comprises an anchor, wherein said decoy comprises a keel, and wherein said anchor removably receives said keel.

5. The adaptable decoy motion system of claim 1, wherein said rudder connects to a flexible steer connecting member, wherein said rudder steers said steer connecting member to move said decoy into the water with subtle movements.

6. The adaptable decoy motion system of claim 1, wherein said connecting rod comprises a spool connector having a line, and wherein said line pulls down said decoy causing said decoy to submerge in said water body upon exerting force on said spool connector.

7. The adaptable decoy motion system of claim 1, further comprises an ice clearing pump attachment positioned in said water body having an ice bed at the top, wherein said ice clearing pump attachment comprises a pole having a pump, and wherein said pump draws warmer water from said water body and expels the water over the surface of said ice bed to melt ice and clear an area to attract said waterfowl.

8. The adaptable decoy motion system of claim 7, wherein said pump comprises an intake tube and an exhaust tube, wherein said intake tube positions in said water body and said exhaust tube positions over said ice bed, and wherein said intake tube draws warmer water from said water body and said exhaust tube expels the water over the surface of said ice bed.

9. A method of providing an adaptable decoy motion system for simulating natural movement of a waterfowl, said method comprising the steps of:
    providing a base structure extending from a surface, and to the level of a water body;
    providing a swivel rod connected to said base structure, said swivel rod capable of turning at an axis of rotation of 360 degrees horizontally with respect to said base structure;
    providing a connecting rod extending from said swivel rod;
    providing a decoy connected at a distal end of said connecting rod;
    providing a motor assembly connected to said connecting rod;
    operating said motor assembly to lift said swivel rod about 20 degrees from said axis of rotation above said water body such that said decoy connected to said connecting rod lifts above said water body and simulates natural movement of a waterfowl;
    providing a pole having a having a pump, said pole being positioned in said water body having an ice bed; and
    drawing warmer water from said water body and expelling the water over the surface of said ice bed via said pump to melt ice and clear an area to attract said waterfowl.

10. The method of claim 9, further comprising:
    turning said swivel rod about 180 degrees and lifting about 20 degrees from said axis of rotation such that said decoy is made to raise above said water body while turning; and
    bringing down said decoy onto the surface of said water body such that said decoy is made to face in another direction.

* * * * *